(12) United States Patent
Dennis et al.

(10) Patent No.: US 7,299,505 B2
(45) Date of Patent: *Nov. 27, 2007

(54) HELMET CUSHIONING PAD WITH VARIABLE, MOTION-REACTIVE APPLIED-LOAD RESPONSE, AND ASSOCIATED METHODOLOGY

(75) Inventors: Michael R. Dennis, Scappoose, OR (US); Michael W. Tucker, Beaverton, OR (US); Gerhard Paasche, Scappoose, OR (US)

(73) Assignee: MJD Innovations, LLC, Scappoose, OR (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/186,142

(22) Filed: Jul. 20, 2005

(65) Prior Publication Data
US 2005/0251899 A1    Nov. 17, 2005

Related U.S. Application Data

(63) Continuation of application No. 10/156,074, filed on May 27, 2002, which is a continuation of application No. 09/942,987, filed on Aug. 29, 2001, now Pat. No. 6,467,099, which is a continuation of application No. 09/390,518, filed on Sep. 3, 1999, now abandoned.

(60) Provisional application No. 60/099,208, filed on Sep. 3, 1998, now abandoned.

(51) Int. Cl.
| | |
|---|---|
| A42B 3/00 | (2006.01) |
| A42B 3/04 | (2006.01) |
| A42B 3/06 | (2006.01) |
| A42B 3/10 | (2006.01) |
| A41D 27/00 | (2006.01) |

(52) U.S. Cl. .......... 2/410; 2/455; 2/412; 2/413; 2/414; 2/425

(58) Field of Classification Search .......... 2/267, 2/410–414, 455
See application file for complete search history.

(56) References Cited

U.S. PATENT DOCUMENTS 2,785,404 A * 3/1957 Strohm .......... 2/412

(Continued)

FOREIGN PATENT DOCUMENTS

SU    0659134    4/1979

OTHER PUBLICATIONS

PORON® 4000 Performance Urethanes -90 Series—Typical Physical Properties (8 pp).

(Continued)

*Primary Examiner*—Gary L. Welch
*Assistant Examiner*—Robert H Muromoto, Jr.
(74) *Attorney, Agent, or Firm*—Jon M. Dickinson, PC; Robert D. Varitz, PC

(57) ABSTRACT

A site-selectable, helmet-installable load-cushioning pad structure employable inside a helmet shell as a part of a plural-spaced-pad distribution featuring a compressible viscoelastic foam core which resists rapid, but not slow-movement, compression. Associated methodology includes the steps of providing such a structure for installation inside the shell of a helmet, and pre-arming the core of that structure with a load-response characteristics which (a) resists sudden-movement, rapid compression, yet (b) offers less resistance to slow-movement compression. An encapsulating moisture barrier layer may be provided around the foam core.

17 Claims, 1 Drawing Sheet

U.S. PATENT DOCUMENTS

| | | |
|---|---|---|
| 3,366,971 A | 2/1968 | Scherz |
| 3,500,472 A | 3/1970 | Castellani |
| 3,507,727 A | 4/1970 | Marshack |
| 3,552,044 A | 1/1971 | Wiele |
| 3,770,483 A | 11/1973 | Komine |
| 3,843,970 A | 10/1974 | Marietta et al. |
| 3,844,862 A | 10/1974 | Sauer et al. |
| 3,882,547 A | 5/1975 | Morgan |
| 3,946,441 A | 3/1976 | Johnson |
| 3,992,721 A | 11/1976 | Morton |
| 3,994,020 A | 11/1976 | Villari |
| 4,006,542 A | 2/1977 | Larson |
| 4,023,209 A | 5/1977 | Frieder, Jr. et al. |
| 4,024,586 A | 5/1977 | Lamb |
| 4,029,534 A | 6/1977 | Bocks et al. |
| 4,044,399 A | 8/1977 | Morton |
| 4,075,717 A | 2/1978 | Lemelson |
| 4,130,948 A | 12/1978 | Krug |
| 4,136,226 A | 1/1979 | Gilman |
| 4,239,106 A | 12/1980 | Aileo |
| 4,272,847 A | 6/1981 | Buhler |
| 4,279,038 A | 7/1981 | Brückner et al. |
| 4,282,610 A | 8/1981 | Steigerwald et al. |
| 4,287,613 A | 9/1981 | Schulz |
| 4,290,149 A | 9/1981 | Aileo |
| 4,338,371 A | 7/1982 | Dawn et al. |
| 4,345,338 A | 8/1982 | Frieder, Jr. et al. |
| 4,432,099 A | 2/1984 | Grick et al. |
| 4,455,684 A | 6/1984 | Johnson |
| 4,484,364 A | 11/1984 | Mitchell et al. |
| 4,504,604 A | 3/1985 | Pilkington et al. |
| 4,534,068 A | 8/1985 | Mitchell et al. |
| 4,558,470 A | 12/1985 | Mitchell et al. |
| 4,561,140 A | 12/1985 | Graham et al. |
| 4,575,871 A | 3/1986 | Auerbach et al. |
| 4,586,200 A | 5/1986 | Poon |
| 4,610,034 A | 9/1986 | Johnson |
| 4,627,114 A | 12/1986 | Mitchell |
| 4,627,115 A | 12/1986 | Broersma |
| 4,633,598 A | 1/1987 | Moronanga et al. |
| 4,677,694 A * | 7/1987 | Crow ................................ 2/9 |
| 4,691,782 A | 9/1987 | Stine |
| 4,695,496 A | 9/1987 | Lee |
| 4,702,963 A * | 10/1987 | Phillips et al. |
| 4,722,946 A | 2/1988 | Hostettler |
| 4,729,132 A | 3/1988 | Fierro |
| 4,808,469 A | 2/1989 | Hiles |
| 4,821,344 A | 4/1989 | Kamata |
| 4,843,642 A | 7/1989 | Brower |
| 4,872,220 A | 10/1989 | Haruvy et al. |
| 4,874,640 A | 10/1989 | Donzis |
| 4,876,805 A | 10/1989 | Peoples |
| 4,916,759 A | 4/1990 | Arai |
| 4,964,178 A | 10/1990 | Giancarlo et al. |
| 4,980,386 A | 12/1990 | Tiao et al. |
| 4,993,076 A | 2/1991 | Dierickx |
| 5,014,041 A | 5/1991 | Rosen |
| 5,014,365 A | 5/1991 | Schulz |
| 5,014,691 A | 5/1991 | Cueman et al. |
| 5,020,163 A * | 6/1991 | Aileo et al. ..................... 2/209 |
| 5,025,504 A | 6/1991 | Benston et al. |
| 5,027,803 A | 7/1991 | Scholz et al. |
| 5,035,009 A | 7/1991 | Wingo, Jr. et al. |
| 5,083,361 A | 1/1992 | Rudy |
| 5,098,421 A | 3/1992 | Zook |
| 5,102,711 A | 4/1992 | Keller et al. |
| 5,165,752 A | 11/1992 | Terry |
| 5,170,510 A | 12/1992 | Nava |
| 5,177,815 A | 1/1993 | Andujar |
| 5,200,256 A | 4/1993 | Dunbar |
| 5,274,846 A | 1/1994 | Kolsky |
| 5,319,867 A | 6/1994 | Weber |
| 5,324,460 A | 6/1994 | Briggs |
| 5,330,249 A | 7/1994 | Weber et al. |
| 5,332,760 A * | 7/1994 | Weisman ..................... 521/54 |
| 5,351,342 A | 10/1994 | Garneau |
| 5,423,087 A | 6/1995 | Krent et al. |
| 5,439,733 A | 8/1995 | Paire |
| 5,463,824 A | 11/1995 | Barna |
| 5,508,334 A | 4/1996 | Chen |
| 5,527,833 A * | 6/1996 | Kuczynski et al. ......... 521/155 |
| 5,534,343 A * | 7/1996 | Landi et al. ............. 428/313.5 |
| 5,539,934 A | 7/1996 | Ponder |
| 5,543,194 A | 8/1996 | Rudy |
| 5,593,769 A | 1/1997 | Wolf et al. |
| 5,653,921 A | 8/1997 | Jenkner |
| 5,655,226 A | 8/1997 | Williams |
| 5,685,021 A | 11/1997 | Tsujino |
| 5,714,229 A | 2/1998 | Ogden |
| 5,722,729 A | 3/1998 | Carilli |
| 5,741,568 A | 4/1998 | Rudy |
| 5,790,988 A | 8/1998 | Guadagnino, Jr. et al. |
| 5,867,840 A | 2/1999 | Hirosawa et al. |
| 5,881,395 A | 3/1999 | Donzis |
| 5,913,412 A | 6/1999 | Huber et al. |
| 5,930,840 A | 8/1999 | Arai |
| 5,943,706 A * | 8/1999 | Miyajima et al. .............. 2/412 |
| 5,946,734 A | 9/1999 | Vogan |
| 5,946,825 A | 9/1999 | Koh et al. |
| 5,974,593 A | 11/1999 | McNabb |
| 6,048,810 A | 4/2000 | Baychar |
| 6,051,624 A * | 4/2000 | Bastin et al. ............... 521/174 |
| 6,065,159 A | 5/2000 | Hirsch |
| 6,070,271 A | 6/2000 | Williams |
| 6,093,468 A | 7/2000 | Toms et al. |
| 6,105,162 A | 8/2000 | Douglas et al. |
| 6,108,825 A | 8/2000 | Bell et al. |
| 6,149,617 A | 11/2000 | McNally et al. |
| 6,154,889 A | 12/2000 | Moore, III et al. |
| 6,195,917 B1 | 3/2001 | Dieckhaus |
| 6,309,741 B1 | 10/2001 | Boyle |
| 6,348,423 B1 | 2/2002 | Griffiths et al. |
| 6,397,400 B1 | 6/2002 | Hassler et al. |
| 6,425,141 B1 * | 7/2002 | Ewing et al. ................... 2/412 |
| 6,467,099 B2 * | 10/2002 | Dennis et al. ................. 2/455 |
| 6,490,730 B1 | 12/2002 | Lyden |
| 6,521,673 B1 * | 2/2003 | Brown ....................... 521/130 |
| 6,552,109 B1 | 4/2003 | Chen |
| 6,704,943 B2 | 3/2004 | Calonge Clavell |
| 6,709,729 B2 | 3/2004 | Baruch |
| 7,159,249 B2 * | 1/2007 | Dennis et al. ................. 2/421 |
| 2002/0184699 A1 | 12/2002 | Ewing et al. |
| 2004/0064005 A1 * | 4/2004 | Rosen ........................ 585/241 |

OTHER PUBLICATIONS 2-pages re PORON 90 (undated -5- pages generally dated 1997).
Heatherstone® Performance Test Results (1 pp).
Oregon Aero ZetaLiner™ helmet liner package insert and catalog page (2 pp).

* cited by examiner

HELMET CUSHIONING PAD WITH VARIABLE, MOTION-REACTIVE APPLIED-LOAD RESPONSE, AND ASSOCIATED METHODOLOGY

CROSS REFERENCES TO RELATED APPLICATIONS

This application is a continuation from currently co-pending U.S. patent application Ser. No. 10/156,074, filed May 27, 2002 for "Body-Contact Protective Interface Structure and Method", which application is a continuation from U.S. patent application Ser. No. 09/942,987, filed Aug. 29, 2001, entitled "Body-Contact Cushioning Interface Structure and Method", now U.S. Pat. No. 6,467,099 B2, granted Oct. 22, 2002, which is a continuation from U.S. patent application Ser. No. 09/390,518, filed Sep. 3, 1999, entitled "Body-Contact Cushioning Interface Structure", now abandoned, which application claims priority to U.S. Provisional Application Ser. No. 60/099,208, filed Sep. 3, 1998, entitled "Body Contact System and Structure for Wearable Garments, such as a Helmet," now abandoned. The disclosure contents of each of these prior-filed patent applications are hereby incorporated herein by reference.

BACKGROUND AND SUMMARY OF THE INVENTION

The present invention relates to a human-body protective, cushioning helmet interface (shock-absorbing) structure (cushioning pad) which is designed especially to be employed as part of a plural-pad distribution deployed within a rigid protective helmet-shell barrier structure to protect the head from a blunt-trauma-type impact injury. More particularly, and from a broadly stated point of view, it relates to a site-selectable, helmet-installable load-cushioning pad taking the form of compressible viscoelastic foam componentry with a structure possessing a load-response behavior which (a) resists sudden-movement rapid compression, yet (b) is less resistive to slow-movement compression.

From a methodologic point of view, the invention features the steps of (a) providing a compressible, viscoelastic load-cushioning pad body for installation inside a helmet, and (b) pre-arming that pad body with load-response characteristics whereby, with the pad in place inside a helmet, the pad body responds to a motion load with behavior which (1) resists sudden-movement, rapid compression, yet (2) offers less resistance to slow-movement compression.

As will be seen, there are other special features and steps which further characterize this invention.

While there are many helmet applications wherein the structure and methodology of the present invention can offer distinct advantages, one preferred embodiment of, and manner of practicing, the invention are described herein specifically in the setting of a military helmet with respect to which the invention has been found to furnish particular utility.

With reference to a conventional military helmet, such an environment is vividly demonstrative of the issues that are successfully addressed by the present invention. For example, the current U.S.-issue military infantry helmet utilizes in its outer shell an internal webbing system combined with a removable leather liner to suspend the helmet on the wearer's head. Airspace between the webbing and the shell of the helmet contributes somewhat to the ballistic, and significantly to the cooling, capabilities of the helmet, but such a webbing system has proven consistently (a) to do a poor job of cushioning shock loads delivered to the wearer's head through the subject helmet, and (b) to be quite uncomfortable, and thus to be the source of many complaints from users.

The structure and methodology of the present invention offer appreciable improvements in these areas of concern regarding helmet performance. This structure and methodology of the invention described herein, feature a novel cushioning structure, and its performance, which offer the very important cooperative characteristics of compression-deformation-and-slow-return viscoelasticity, non-springiness, and what is known as acceleration-rate(strain-rate)-sensitivity. Another way of expressing these special qualities of the present invention is, as suggested above, to say that the invention features the use of compressible viscoelastic foam componentry (a pad) which resists sudden-movement rapid compression, yet which is less resistive to slow-movement compression.

According to the invention, it features a load-cushioning instrumentality formed from one, or a plurality of, body(ies) of a viscoelastic foam material which responds acceleration (strain)-rate-resistantly to shock-produced, sudden-motion, rapid acceleration, with this material having a resistance to resulting compression deformation that generally rises in a somewhat direct relationship to the level, or magnitude, of acceleration. Thus, the smaller (slower) the acceleration, the less resistant such material is to compression, and, the larger (faster) the acceleration, the more resistant it is to compression. This kind of acceleration-rate(strain-rate)-sensitivity is somewhat analogous to the phenomenon known in the world of fluid mechanics as shear-resistant fluid dilatancy. This behavior, in the "world" of a helmet shell, causes a shock load to be transmitted to, and borne by, the wearer's head over a relatively wide surface area, and thus generally reduces the likelihood of serious injury.

The rate-sensitive material proposed by the structure of this invention to form the core of a load-cushioning pad structure also responds to (and following) an impact event by recovering slowly from compression deformation to an undeformed condition—thus avoiding any dangerous "rebound", spring-back activity. In point of fact, the load-cushioning material employed in accordance with the invention is decidedly non-springy in character. As will be further mentioned, the load-cushioning material proposed by the invention, in order to be capable of dealing most effectively in direct combination with a rigid helmet shell in the protection against head impacts, possesses a durometer with a minimum ILD number of about 15-ILD. In the environment of a helmet, the load-cushioning material used by the invention provides the only cushioning response acting between a helmet shell and a wearer's head.

The rate-sensitive core structure can be, selectively, either of a single-component or of a plural-component (plural sublayers) nature, and in the setting of a military helmet, preferably takes the form of two, individual, viscoelastic sublayers which have two different durometers. In this helmet setting, and during use by a wearer, the lower-durometer sublayer is employed closer to the head, and the higher-durometer sublayer is on the opposite side of the lower-durometer sublayer relative to the head, and is interposed the lower-durometer sublayer and the inside of a helmet shell. Within, and throughout the full, three-dimensional boundaries of each rate-sensitive, viscoelastic layer, the layer material therein is unfettered in its uniform, omni-directional performance in response to introduced impact/shock loads. No other structure extends as a "non-homogeneous" anomaly through and in this region, which other structure would alter such uniform, all-over, load-response behavior.

The core structure may be encapsulated by a thin moisture barrier jacket.

The association which exists, according to the present invention, between the load-cushioning pad structure and a helmet shell, is that the helmet shell converts whatever kind of specific impact occurs to it from the outside to a broad-area, blunt-trauma kind of event which is delivered directly to the load-cushioning pad structure without there being any interposed, other load-managing material, such as any material with springy rebound (resilience) behavior. Such a blunt-trauma event presented through the shell to the load-cushioning structure takes maximum advantage of the cushioning capabilities of the load-cushioning structure, and results in significant anti-injury impact delivery to the head of a helmet wearer.

With the load-cushioning (shock-absorbing) structure of this invention incorporated for use in conjunction with an operatively associated helmet shell, a load-transmission path exists between that shell and the head of a wearer. In this path, compression deformation and return response to a shock load delivered to the outside of the shell is solely determined by the characteristics of the invention's load-cushioning pad structure. Nothing in this path introduces any form of a resilient, spring-back rebound response.

The structure of this invention is easily rendered in a variety of specific configurations, and thus is readily usable in a host of different helmet settings. It is relatively easy and inexpensive to manufacture, and it can be introduced very conveniently in a wide range of helmet "retrofit" situations. It is employed within, and in conjunction with, a helmet shell as a user site-selectable distribution of plural load-cushioning pads. Overall structure thickness can be selectively chosen to be different for different circumstances. A single, or more than two, rate-sensitive sublayer(s) can be employed in the core pad structure. Within a relatively wide range (set forth below herein), a different specific durometer value (or values in a stack of sublayers) for the rate-sensitive sublayer(s) can be chosen.

All of the special features and advantages mentioned above that are offered by the present invention will now become more fully apparent as the description which follows below is read in conjunction with the accompanying drawings.

DETAILED DESCRIPTION OF, AND BEST MODE FOR CARRYING OUT, THE INVENTION

Figure 1:
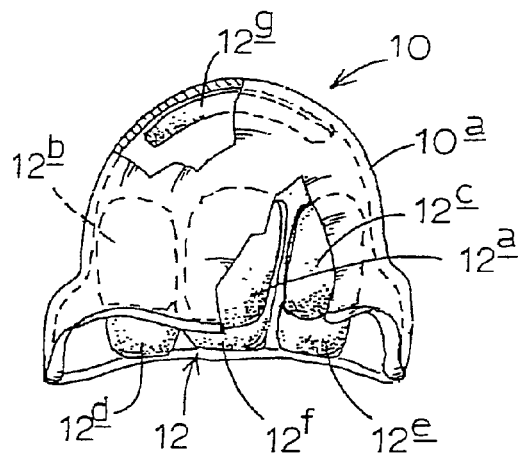
FIG. 1 is a front elevation (with certain portions broken away to reveal details of internal construction) of a military helmet whose outer shell is equipped, at plural, distributed, selected sites, on its inside, with plural, individual pad-like expanses (seven in total number herein) of load-cushioning pad structure constructed in accordance with the present invention.
Figure 2:
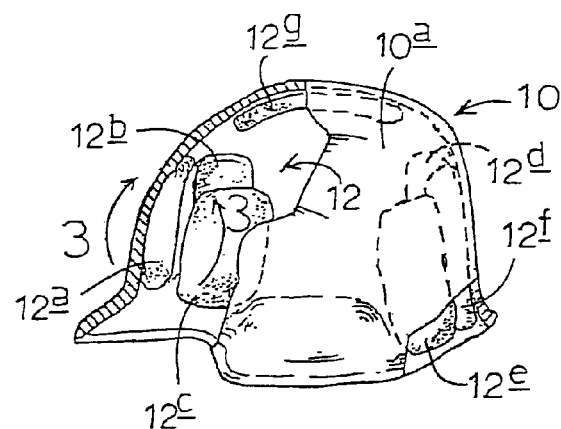
FIG. 2 is a side elevation (also with portions broken away to reveal internal construction) of the helmet of FIG. 1, on about the same scale as and taken generally from the right side of, FIG. 1, with load-cushioning structure which is contained within the shell of this helmet being illustrated in a condition tilted slightly toward the viewer in this figure.
Figure 3:
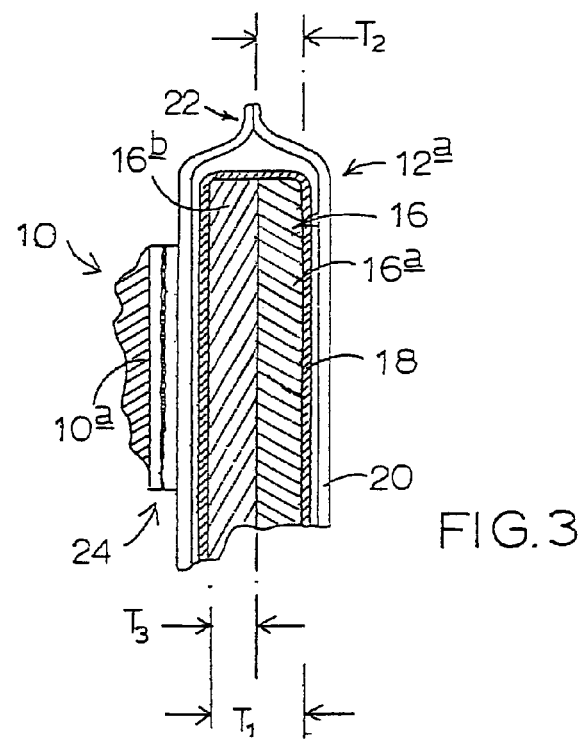
FIG. 3 is an enlarged-scale, fragmentary detail taken generally in the area of curved arrows 3-3 in FIG. 2, showing, in cross section, one of the several, selectively site-specific, load-cushioning pad structures of the invention employed in the shell of the helmet of FIGS. 1 and 2.

Turning attention now to FIGS. 1, 2 and 3, indicated generally at 10 is a military helmet including a shell 10a. In all respects, shell 10a is completely conventional in construction, and might have any one of a number of different specific constructions and configurations.

Fastened in one of a variety of appropriate manners on the inside, concave, dome-like surface of shell 10a is an installation 12 of inside-site-selectable, shock-absorbing, load-cushioning pad structures constructed and operable in accordance with the present invention. Installation 12, in the particular setting illustrated in these figures and now being described, includes seven, individual, multi-layer, load-cushioning pad structures, or pads, 12a, 12b, 12c, 12d, 12e, 12f, 12g, each of which includes one preferred form of a central, or core, load-cushioning instrumentality possessing certain characteristics which are key to the structure and functionality of the present invention. Pad 12a is joined to the inside surface of shell 10a in the frontal, central portion of that surface. Pads 12b, 12c are disposed on laterally opposite sides of pad 12a. Pads 12d, 12e are located in laterally spaced places on the inside, lower, rear portion of the inside surface of shell 10a. Pad 12f is positioned centrally between pads 12d, 12e. Pad 12g is disposed on the upper (or crown) portion of the inside surface of shell 10a.

The perimetral shapes and the locations of the illustrated seven pads, and indeed the specific number of pads chosen for use in helmet 10 in this form of the invention, are completely matters of selection and choice. These specific shapes, locations, and this "pad-count" number, have been chosen in relation to equipping the shell of helmet 10 with one appropriate and versatile, overall load-cushioning interface structure that acts between a wearer's head and shell 10a. A description of a preferred construction for pad 12a which now follows, fully describes the construction of each of the other six pads in installation 12.

Accordingly, pad 12a includes a central, or core, load-cushioning structure 16 made up preferably of two, viscoelastic foam sublayers 16a, 16b, though this core could be a single (or greater number) layer structure if desired. This core structure, viewed either individually as something which can be installed inside the shell of a helmet, or as part of a cooperative combination with the outer shell (10a) of a helmet, constitutes a principal contributor to the present invention.

Encapsulating this core structure, if so desired, is an applied, elastomeric, moisture-blocking, and preferably gas-permeable, barrier layer, or film, 18. Surrounding the encapsulated core structure is a fabric moisture-wicking structure 20.

Specific materials useable in the various components of each of the illustrated load-cushioning pads are set forth below herein.

Continuing with a description of pad 12a, the right side of this pad in FIG. 3 is referred to herein as the body-facing, or wearer's-head-facing, side, and the left side of the pad in this figure is referred to as the load-facing, or helmet-facing, side. Each of the two foam sublayers (16a, 16b) which make up core structure 16 is formed, importantly, of a suitable acceleration-rate(strain-rate)-sensitive material, such as a viscoelastic urethane compression-deformation-and-slow-return material, which possesses, in technical terms known to those skilled in art, acceleration-rate(strain-rate)-sensitivity.

With regard to acceleration-rate(strain-rate)-sensitivity, the materials in sublayers 16a, 16b respond to compressive accelerations each with a compression-deformation resistance behavior that is likenable generally to the shear-resistance behavior which is observed in certain fluids as a phenomenon known as fluid dilatancy. When compressive pressure is applied to these materials, if that pressure application is done at a very low acceleration rate, the materials respond very readily (i.e., are easy to compress slowly) and fairly instantaneously with a yielding deformation response. However, if such a pressure is applied rapidly, i.e., with a rapid (large) acceleration rate, the materials tend to act very much like solids, and they do not respond rapidly with a yielding deformation action (i.e., they resist sudden-movement, rapid compression). Generally speaking, the higher the rate of acceleration associated with an applied compressing force, the more like a solid material do sublayers 16a, 16b behave.

An important consequence of this acceleration-response characteristic is that the structure of the invention offers, in relation to prior art structures, a superior shock-cushioning action, particularly when it is employed as the sole shock-absorbing mechanism. It thus offers a significant improvement in injury avoidance.

A contributing factor also in this regard is that the materials in sublayers 16a, 16b, after undergoing a compressive deformation, return relatively slowly toward their pre-deformation configurations. Another way of viewing this slow-return behavior is to think of it as one whereby the core cushioning material exerts a low, or reduced, push-back force on whatever, such as a helmet wearer's head, is in contact with that core material.

The preferred two-sublayer make-up for core structure 16 is further characterized by the fact that the rate-sensitive, viscoelastic material in sublayer 16a has a lower durometer (lower hardness) and Indentation Load Deflection (ILD) response number than does the material in sublayer 16b. Specifically, and in the construction now being described, sublayer 16a has a durometer with an ILD number (or rating) preferably no less than substantially 15-ILD, and preferably higher up in the ILD number range of about 15 to about 28. Sublayer 16b, in relation to sublayer 16a, has a larger durometer (greater hardness), with an ILD rating (or number) preferably in the range of about 42-ILD to about 55-ILD. Sublayer 16a herein is made of a viscoelastic foam material designated as Confor CF-42, made by a company called EAR Specialty Composites in Indianapolis, Ind. Sublayer 16b is made of a viscoelastic foam material designated as Confor CF-45, also made by this same company. A recognized consequence of the just-expressed differences between sub-layers 16a, 16b is that sublayer 16a can be seen as possessing a lower energy-absorption capacity (because it is softer) than does sublayer 16b (because this sublayer is harder).

The overall thickness of core structure 16, i.e. the dimension thereof measured laterally (or from left to right sides) in FIG. 3 (shown at $T_1$), is preferably about ⅞-inches. Sublayer 16a has a thickness pictured in FIG. 3 at $T_2$ (measured in the same fashion) preferably of about ⅜-inches, and sublayer 16b, a thickness pictured in FIG. 3 at $T_3$ preferably of about ½-inches. Different thickness dimensions may, of course, be chosen for various purposes, including for "sizing" purposes, to aid in achieving a proper and comfortable helmet fit.

Within the context of a two-sublayer make-up for core structure 16, and with respect to an overall core structure thickness which is greater than about ½-inches, it is preferable that the thickness of sublayer 16a be maintained at no less than about ⅜-inches. Where the overall thickness of core structure 16 is reduced to about ½-inches or less, it is preferable here that this core structure be made of but a single layer of "lower durometer type" viscoelastic material, but preferably with and ILD number which is no less than about 15-ILD.

Under all circumstances, it is preferable, where a multi-sublayer structure is employed for core structure 16, that the layer thereof which is toward the wearer's-head-facing side of the whole assembly have the lowest (in the case of more than two layers) durometer and ILD number associated with it.

Another consideration regarding the structure of core structure 16 is that, preferably, it have a quite uniform thickness throughout. Uniformity of thickness plays an important role in maximizing the capability of this core structure to conform as precisely as possible with, in the case of a helmet, the topography of the wearer's head. My practice has been to create such a core structure with an overall thickness which lies within a tolerance range of about ±0.002-inches. This is the thickness tolerance which characterizes the core structure pictured in helmet 10.

Within the three-dimensional pad core body of each of the two viscoelastic foam sublayers, there is no other structure present, save ambient and entrained gas. Accordingly, each such core body responds to shock loads substantially uniformly, and omnidirectionally, throughout its entirety.

Barrier layer, or jacket, 18, which completely surrounds, encapsulates and envelops core structure 16 in pad 12a, is herein a sprayed-on layer formed of a vinyl-solvent-based elastomeric material known as Russell Coating, and sold under the product designator V-2000. It is made by Russell Products Company, Inc. at 275 N. Forge Street, Akron, Ohio 44304.

In general terms, the coating product forms a smooth abrasion-resistant skin-like protective layer over the outside surfaces of core structure 16. It provides a breathable and durable membrane skin on the outside of the core structure which completely blocks penetration of moisture into the core structure, yet permits relatively free bidirectional gas flow into and out of the core structure. Thus, it permits "breathing" of core structure 16 under circumstances of compression and return-from-compression. In the specific setting of the military helmet now being described for illustration purposes, full "jacketing" of the core cushioning structure by the barrier layer enables the helmet be fully immersible in water without experiencing any degradation in cushioning-material performance, which degradation would result from any moisture entrance into the rate-sensitive core material.

Jacketing the outside of core structure 16, as shown herein, is moisture-wicking layer 20. This layer is preferably distributed somewhat in the form of an enclosure bag around the core structure and barrier layer. In the construction now being described, layer 20 takes the form of a polyester fabric (with a nominal thickness of about 0.015-inches) known as Orthowick, made by Velcro Laminates, Inc., 54835 C.R. 19, Bristol, Ind. 46507. Specifically, this Orthowick material bears the following product designator: VELCRO® brand Loop 3993. The bag form of layer 20 may be closed, as by stitching, generally where appropriate, and such stitching exists, for example, in the area shown at 22 in FIG. 3. As can be seen, this stitching does not penetrate the barrier layer.

Pad 12a is suitably and preferably releasably anchored to the inside of helmet shell 10a through a two-component conventional hook-and-pile structure 24 typically sold under the name Velcro—a readily commercially available product made by Velcro USA, Inc., 406 Brown Avenue, Manchester, N.H. 03108-4806. One component of this hook-and-pile structure is suitably attached either directly to core structure 16, or to any outside-layer covering structure employed with this core structure, and is located on what was referred to earlier as the load-facing side of pad 12a. The other component of the hook-and-pile structure is suitably joined to the inside surface (at the appropriate location) of helmet shell 10a.

As one can readily tell from the drawings herein, pad 12a, and the other pads cooperatively employed, are site-selectably placeable generally where desired inside a helmet shell, such as shell 10a, by the wearer.

Figure 4:
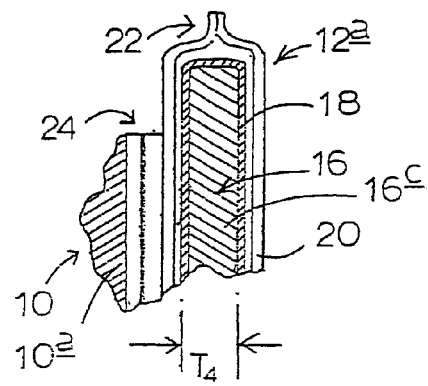
FIG. 4 is a view showing a modified form of load-cushioning pad structure constructed in accordance with the invention.

FIG. 4 in the drawings illustrates a modified form of a load-cushioning pad 12a made in accordance with the invention. This pad differs from the pad as shown in FIG. 3 by the fact that core structure 16 here includes but a single, acceleration-rate(strain-rate)-sensitive, viscoelastic foam component 16c. Component 16c has a thickness, indicated at $T_4$ in FIG. 4, of about ½-inches, and is formed generally of the same kind of viscoelastic foam material described earlier as having a durometer rating with an ILD number in the range of from about 15 to about 28. Thus, component 16c herein is preferably made of the EAR Specialty Composites material designated as Confor CF-42.

There is thus provided by the present invention a unique, shock absorbing, load-cushioning structure which offers the various compression-and-slow-return, non-springy, acceleration-rate(strain-rate)-sensitive, viscoelastic benefits ascribed to it hereinabove—which benefits offer significant improvements over related prior art structures.

If and when a shock load is transmitted through the helmet shell to the head of the wearer, it emerges on the inside of the shell as a blunt-trauma-type event which is delivered to the inside-installed load-cushioning structure. The rate-sensitive nature of this cushioning structure causes that structure to respond with the very effective behavior described earlier herein, namely, to act in an acceleration-resistant and anti-spring-back fashion that causes such an event to be further distributed over a very broad expanse, and to be managed without there being any negative and dangerous rebound repercussions.

This unique behavior of the present invention causes it to offer superior ballistic response capabilities in relation to preventing the likelihood of a serious head injury. The operational features of the load-cushioning pad structure of this invention contribute significantly to the invention's superior behavior.

While the invention has been disclosed in particular settings, and in particular forms herein, the specific embodiments disclosed, illustrated and described herein are not to be considered in a limiting sense. Numerous variations, some of which have been discussed, are possible. Applicant regards the subject matter of his invention to include all novel and non-obvious combinations and subcombinations of the various elements, features, functions and/or properties disclosed herein.

We claim:

1. A site-selectable, helmet-installable, non-springy load-cushioning pad deployable as one of a collection of plural, spaced pads inside the shell of a helmet comprising compressible, non-springy, viscoelastic, urethane foam componentry with a structure possessing a load-response behavior which (a) resists sudden-movement rapid compression, yet (b) is less resistive to slow-movement compression, wherein said urethane foam componentry compression characteristics are degraded when exposed to water-based moisture, and completely covering said componentry, an encapsulating elastomeric film formed of material which functions simultaneously, over the entire outside surface of said componentry, to block all outside water-based moisture from reaching said componentry, while at the same time offering over the entire outside surface bidirectional gas permeability of all non-water-based gases to preserve non-springiness of the pad as a whole.

2. The pad of claim 1, wherein said foam componentry is acceleration-rate (strain-rate) sensitive.

3. The pad of claim 1, wherein said foam componentry exhibits a slow-return, slow push-back-force characteristic.

4. The pad of claim 1, where said foam componentry is layered, and includes at least two operatively adjacent layers.

5. The pad of claim 2, wherein said foam componentry is layered, and includes at least two operatively adjacent layers.

6. The pad of claims 4, wherein said at least two layers differ from one another in load-response, energy-absorption characteristics.

7. The pad of claim 5, wherein said at least two layers differ from one another in load-response, energy-absorption characteristics.

8. The pad of claim 4, wherein said at least two layers differ in hardness.

9. The pad of claim 5, wherein said at least two layers differ in hardness.

10. The pad of claim 6, wherein, when the pad is installed appropriately in a helmet, the layer possessing the lower load-response, energy-absorption characteristic is disposed intermediate (a) the other layer, and (b) the space in the helmet provided for receiving a wearer's head.

11. The pad of claim 7, wherein, when the pad is installed appropriately in a helmet, the layer possessing the lower load-response, energy-absorption characteristic is disposed intermediate (a) the other layer, and (b) the space in the helmet provided for receiving a wearer's head.

12. The pad of claim 8, wherein, when the pad is installed appropriately in a helmet, the layer possessing the lesser hardness is disposed intermediate (a) the other layer, and (b) the space in the helmet provided for receiving a wearer's head.

13. The pad of claim 9, wherein, when the pad is installed appropriately in a helmet, the layer possessing the lesser hardness is disposed intermediate (a) the other layer, and (b) the space in the helmet provided for receiving a wearer's head.

14. The pad of claim 6, wherein, with the pad disposed in operative condition in a helmet, said foam componentry has a helmet-facing side, and an opposite, wearer's-head-facing side, the layer in this componentry which possesses the lower load-responsive, energy-absorption characteristic is disposed toward said wearer's-head-facing side relative to the other layer, and which further comprises a moisture-wicking material disposed intermediate said layer with the lower load-responsive, energy-absorption characteristic and the space in the helmet provided to receiving a wearer's head.

15. The pad of claim 7, wherein, with the pad disposed in operative condition in a helmet, said foam componentry has a helmet-facing side, and an opposite, wearer's-head-facing side, the layer in this componentry which possesses the lower load-responsive, energy-absorption characteristic is disposed toward said wearer's-head-facing side relative to the other layer, and which further comprises a moisture-wicking material disposed intermediate said layer with the lower load-responsive, energy-absorption characteristic and the space in the helmet provided to receiving a wearer's head.

16. The pad of claim 8, wherein, with the pad disposed in operative condition in a helmet, said foam componentry has a helmet-facing side, and an opposite wearer's-head-facing side, the layer in this componentry which possesses the lesser hardness is disposed toward said wearer's-head-facing side relative to the other layer, and which further comprises a moisture-wicking material disposed intermediate said layer with the lesser hardness and the space in the helmet provided for receiving a wearer's head.

17. The pad of claim 9, wherein, with the pad disposed in operative condition in a helmet, said foam componentry has a helmet-facing side, and an opposite wearer's-head-facing side, the layer in this componentry which possesses the lesser hardness is disposed toward said wearer's-head-facing side relative to the other layer, and which further comprises a moisture-wicking fabric material disposed intermediate said layer with the lesser hardness and the space in the helmet provided for receiving a wearer's head.

* * * * *